US011611957B2

(12) United States Patent
Fwu et al.

(10) Patent No.: US 11,611,957 B2
(45) Date of Patent: Mar. 21, 2023

(54) DEVICE, SYSTEM AND METHOD EMPLOYING UNIFIED FLEXIBLE 5G AIR INTERFACE

(71) Applicant: Apple Inc., Cupertino, CA (US)

(72) Inventors: Jong-Kae Fwu, Sunnyvale, CA (US); Gang Xiong, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/724,711

(22) Filed: Apr. 20, 2022

(65) Prior Publication Data
US 2022/0256520 A1 Aug. 11, 2022

Related U.S. Application Data

(63) Continuation of application No. 16/742,043, filed on Jan. 14, 2020, now Pat. No. 11,317,403, which is a
(Continued)

(51) Int. Cl.
*H04W 4/00* (2018.01)
*H04W 72/044* (2023.01)
(Continued)

(52) U.S. Cl.
CPC ......... *H04W 72/044* (2013.01); *H04L 5/0037* (2013.01); *H04L 5/0092* (2013.01);
(Continued)

(58) Field of Classification Search
None
See application file for complete search history.

(56) References Cited

U.S. PATENT DOCUMENTS

2007/0155387 A1 7/2007 Li et al.
2008/0130570 A1 6/2008 Jung et al.
(Continued)

FOREIGN PATENT DOCUMENTS

CN 102264110 11/2011
CN 104159234 11/2014
(Continued)

OTHER PUBLICATIONS

Chinese Application Serial No. 201580075564.4, Office Action dated Jun. 19, 2019, w/English translation, 17 pgs.
(Continued)

*Primary Examiner* — Zewdu A Beyen
(74) *Attorney, Agent, or Firm* — Kowert, Hood, Munyon, Rankin & Goetzel, P.C.

(57) ABSTRACT

An eNodeB (eNB), user equipment (UE) and method of providing a flexible Radio Access Technology (FRAT) are generally described. The information (resource allocation, partition information and numerology) of at least one of a plurality of RATs used by the eNB is provided to a UE. Each RAT has a flexible subcarrier spacing and symbol duration, which are integer multiples of a base subcarrier spacing and symbol duration, and is associated with at least one of different temporal and frequency resources. The symbol and/or frame structure of each RAT are independent. A Transmission Time Interval (TTI) boundary between the RATs is common, and the RATs comprise a common reference TTI duration. The information of the RATs is provided either via a different RAT than the RAT used by the UE for communication or via a dedicated carrier in the RAT used by the UE for communication.

20 Claims, 7 Drawing Sheets

Related U.S. Application Data continuation of application No. 15/542,716, filed as application No. PCT/US2015/044628 on Aug. 11, 2015, now Pat. No. 10,548,129.

(60) Provisional application No. 62/114,733, filed on Feb. 11, 2015.

(51) Int. Cl.

| | |
|---|---|
| *H04W 72/12* | (2023.01) |
| *H04L 5/00* | (2006.01) |
| *H04L 27/26* | (2006.01) |
| *H04W 4/70* | (2018.01) |
| *H04W 88/06* | (2009.01) |
| *H04W 88/10* | (2009.01) |
| *H04L 1/00* | (2006.01) |
| *H04W 76/27* | (2018.01) |
| *H04W 88/02* | (2009.01) |

(52) U.S. Cl.
CPC .... *H04L 27/2602* (2013.01); *H04L 27/26025* (2021.01); *H04W 4/70* (2018.02); *H04W 72/1205* (2013.01); *H04L 1/0025* (2013.01); *H04L 5/0007* (2013.01); *H04L 5/0053* (2013.01); *H04W 76/27* (2018.02); *H04W 88/02* (2013.01); *H04W 88/06* (2013.01); *H04W 88/10* (2013.01)

(56) References Cited

U.S. PATENT DOCUMENTS

| | | | |
|---|---|---|---|
| 2010/0278142 A1 | 11/2010 | Dwyer et al. | |
| 2012/0140743 A1* | 6/2012 | Pelletier | H04W 88/06 370/335 |
| 2013/0188756 A1* | 7/2013 | Sundstrom | H04L 27/26524 375/319 |
| 2014/0140194 A1 | 5/2014 | Fechtel | |
| 2015/0029990 A1 | 1/2015 | Marinier et al. | |
| 2016/0095108 A1 | 3/2016 | Ryoo et al. | |
| 2016/0234820 A1 | 8/2016 | Mallik et al. | |
| 2017/0231009 A1 | 8/2017 | Wang | |

FOREIGN PATENT DOCUMENTS

| | | |
|---|---|---|
| CN | 107210810 | 9/2017 |
| EP | 3103299 A1 | 12/2016 |
| WO | 2014139562 A1 | 9/2014 |
| WO | 2015148076 A1 | 10/2015 |
| WO | 2016130175 A1 | 8/2016 |

OTHER PUBLICATIONS

European Application Serial No. 15882255.1, Response filed May 7, 2019 to Extended European Search Report dated Oct. 12, 2018, 26 pgs.

European Application Serial No. 15882255.1, Extended European Search Report dated Oct. 12, 2018, 13 pgs.

International Application Serial No. PCT/US2015/044628, International Preliminary Report on Patentability dated Aug. 24, 2017, 12 pgs.

International Application Serial No. PCT/US2015/044628, International Search Report dated Dec. 21, 2015, 3 pgs.

International Application Serial No. PCT/US2015/044628, Written Opinion dated Dec. 21, 2015, 10 pgs.

Eeva, Lahetkangas, et al., "On the Flexible 5G Dense Deployment Air Interface for Mobile Broadband", 5G for Ubiquitous Connectivity (5GU), 2014 1st International Conference, (2014), 57-61 pgs.

* cited by examiner

DEVICE, SYSTEM AND METHOD EMPLOYING UNIFIED FLEXIBLE 5G AIR INTERFACE

PRIORITY CLAIM

This application is a continuation of U.S. patent application Ser. No. 16/742,043, filed Jan. 14, 2020, and entitled "DEVICE, SYSTEM AND METHOD EMPLOYING UNIFIED FLEXIBLE 5G AIR INTERFACE", which is a continuation of U.S. patent application Ser. No. 15/542,716, filed Jul. 11, 2017, and entitled "DEVICE, SYSTEM AND METHOD EMPLOYING UNIFIED FLEXIBLE 5G AIR INTERFACE", now U.S. Pat. No. 10,548,129, which is a U.S. National Stage Filing under 35 U.S.C. 371 from International Application No. PCT/US2015/044628, filed Aug. 11, 2015, which claims the benefit of priority to U.S. Provisional Patent Application Ser. No. 62/114,733, filed Feb. 11, 2015, and entitled "UNIFIED FLEXIBLE 5G NEW AIR INTERFACE DESIGN," which are incorporated herein by reference in their entirety. The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to radio access networks. Some embodiments relate to a unified communication framework using Radio Access Technologies (RAT) in $5^{th}$ generation (5G) cellular networks.

BACKGROUND

The use of personal communication devices has increased astronomically over the last several decades. The penetration of mobile devices in modern society has continued to drive demand for a wide variety of networked devices in a number of disparate environments. The variety of available applications, especially video-related applications, has led to a concomitant increase in demand for increased bandwidth beyond that provided by Third Generation Partnership Project Long Term Evolution (3GPP LTE) and LTE advanced (LTE-A) systems.

The next generation wireless communication system, 5G, may provide access to information and sharing of data using a network that may be required to meet vastly different and sometimes conflicting performance dimensions and services driven by different services and use cases. It is therefore desirable that the next generation communication system be flexible and capable of providing high speed communications services for a wide ambit of devices under a multiplicity of circumstances.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
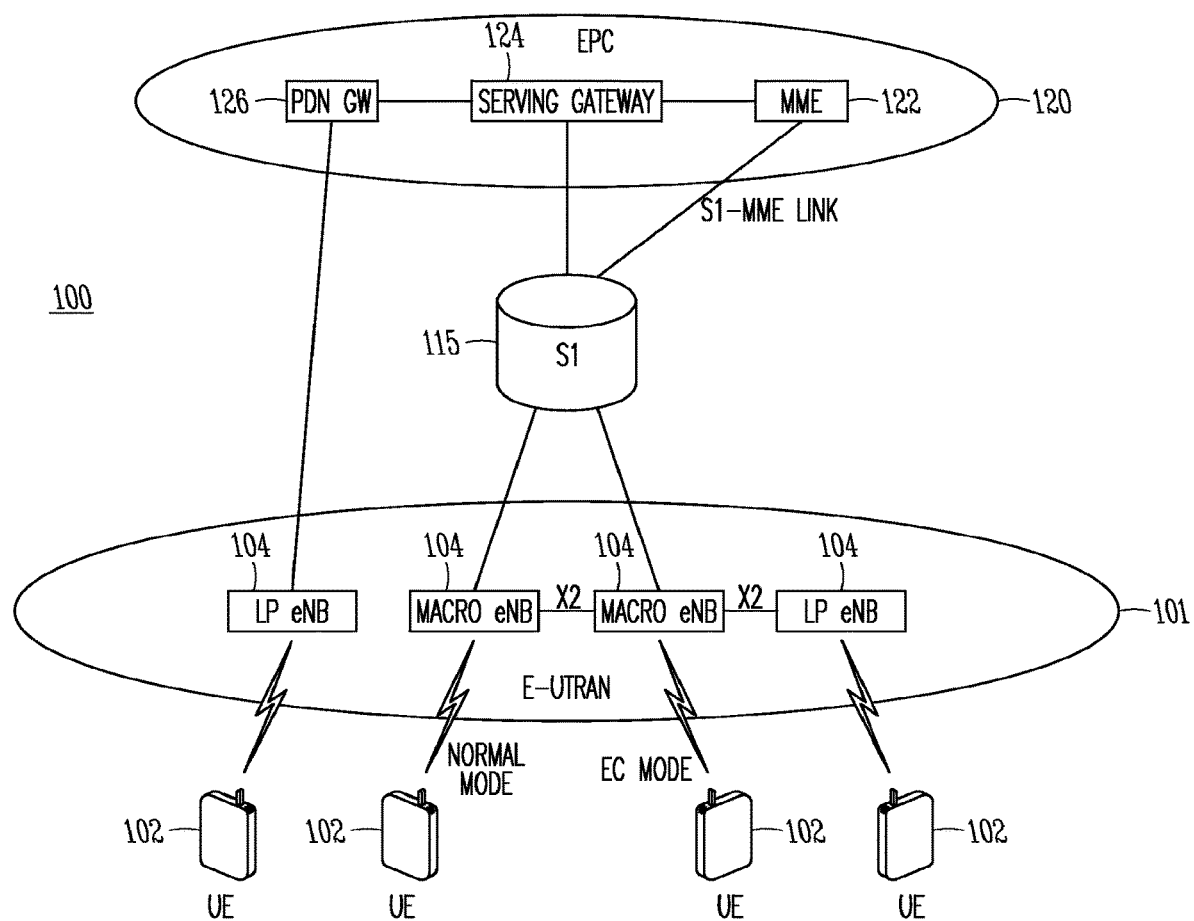
FIG. 1 is a functional diagram of a 3GPP network in accordance with some embodiments.

FIG. 1 is a functional diagram of a 3GPP network in accordance with some embodiments. The network may comprise a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes eNBs 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes traffic packets (such as data packets or voice packets) between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes traffic packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. The eNBs 104 may communicate both with UEs 102 in a normal coverage mode and UEs 102 in one or more enhanced coverage modes. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with some embodiments, UEs 102 may be configured to communicate via orthogonal multiple access (OMA) communications such as Time Division Multiple Access (TDMA), Frequency Division Multiple Access (FDMA) Orthogonal FDMA (OFDMA), SC-FDMA or other communication signals with an eNB 104 over a multicarrier communication channel in accordance with the appropriate communication technique. The OFDM signals may comprise a plurality of orthogonal subcarriers. In accordance with some embodiments, UEs 102 may be configured to communicate via non-orthogonal multiple access (NOMA) signals.

The S1 interface 115 is the interface that separates the RAN 100 and the EPC 120. It is split into two parts: the S1-U, which carries traffic packets between the eNBs 104 and the serving GW 124, and the S1-MME, which is a signaling interface between the eNBs 104 and the MME 122.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell cNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

As indicated in more detail below, communication over a 4G LTE network may be split up into 10 ms frames, each of which may contain ten 1 ms subframes. Each subframe of the frame, in turn, may contain two slots of 0.5 ms. The eNB may schedule uplink and downlink transmissions over a variety of frequency bands. The allocation of resources in subframes used in one frequency band and may differ from those in another frequency band. Each slot of the subframe may contain 6-7 symbols, depending on the system used. In some embodiments, the subframe may contain 12 or 24 subcarriers. A resource grid may be used for downlink and uplink transmissions between an eNB and a UE. The resource grid may be a time-frequency grid, which is the physical resource in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE in the current 3GPP standard. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. The duration of the resource grid in the time domain corresponds to one subframe or two resource blocks. Each resource grid may comprise 12 (subcarriers)*14 (symbols)=168 resource elements for normal cyclic prefix (CP) case. Several different physical channels may be conveyed using such resource blocks. As discussed in more detail below, in a 5G network, the sizes of the resource blocks, resource elements, and symbols, among others, may vary.

There may be several different physical downlink channels that are conveyed using such resource blocks, including the physical downlink control channel (PDCCH) and the physical downlink shared channel (PDSCH). Each subframe may contain a PDCCH, physical hybrid-ARQ indicator channel (PHICH), physical control format indicator channel (PCFICH) and the PDSCH. The PDCCH may normally occupy the first up to three symbols (four in the case of narrow bandwidths of 1.4 MHz) of each subframe and carry, among other things, information about the transport format and resource allocations related to the PDSCH channel and uplink scheduling grants for a physical uplink shared channel (PUSCH) transmission. The PHICH may be used to signal HARQ information in response to a PUSCH transmission. The PCFICH may inform the UE the control region size (e.g. one, two or three OFDM symbols) in each downlink subframe. The PDSCH may carry user data and higher layer signaling to a particular UE and occupy the remainder of the downlink subframe to avoid the resources in which downlink control channels (PDCCH/PHICH/PCFICH) To are transmitted. Typically, downlink scheduling (assigning control and shared channel resource blocks to UEs within a cell) may be performed at the eNB based on channel quality information provided by the UEs, and then the downlink resource assignment information may be sent to a scheduled UE on the PDCCH used for (assigned to) PDSCH reception of the UE.

The PDCCH may contain downlink control information (DCI) in one of a number of formats that tell the UE where to find and how to decode the data, transmitted on PDSCH in the same subframe, from the resource grid. The DCI may provide details such as the number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the RNTI, which may be UE-specific, may limit decoding of the DCI information (and hence the corresponding PDSCH) to only the intended UE. The PDCCH may be located in any of a number of frequency/temporal regions, depending on whether the PDCCH is UE-Specific or common, as well as the aggregation level. The set of possible candidate locations for the PDCCH is defined in terms of search spaces. A search space is defined by a set of Control Channel Element (CCE) candidates with a number of aggregation level Le {1,2,4,8} where the UE may monitor to find its PDCCHs. A common search space may carry DCIs that are common for all UEs; for example, system information (using the S1-RNTI), paging (P-RNTI), PRACH responses (RA-RNTI), or UL TPC commands (TPC-PUCCH/PUSCH-RNTI). A UE-specific search space may carry DCIs for UE-specific allocations using a Cell Radio-Network Temporary Identifier (C-RNTI) assigned to the UE, a semi-persistent scheduling (SPS C-RNTI), or an initial allocation (temporary C-RNTT). When configuring an SPS (either uplink or downlink), the SPS C-RNTI is provided by the eNB and the UE is configured by higher layers to decode a PDCCH with a CRC scrambled by the SPS C-RNTI. The UE may monitor the PDCCH having a CRC scrambled by the SPS C-RNTI in every subframe as the eNB can activate/re-activate/release the SPS at any time using a DCT format with a CRC scrambled by an SPS C-RNTI. The received DCI format with a CRC scrambled by the SPS C-RNTI can be a grant/assignment for a retransmission or for activation/re-activation/release of the SPS. 3GPP Technical Specification 36.213 has tabulated the validation procedure for activation/re-activation/release of SPS.

In addition to the PDCCH, an enhanced PDCCH (EPDCCH) may be used by the eNB and UE. The PDSCH may thus contain data in some of the resource blocks (RBs) and then EPDCCH contains the downlink control signals in others of the RBs of the bandwidth supported by the UE. Different UEs may have different EPDCCH configurations. The sets of RBs corresponding to EPDCCH may be configured, for example, by higher layer signaling such as Radio Resource Control (RRC) signaling for EPDCCH monitoring.

The Physical Uplink Control Channel (PUCCH) may be used by the UE to send Uplink Control Information (UCT) to the eNB. The PUCCH may be mapped to an UL control channel resource defined by an orthogonal cover code and two resource blocks (RBs), consecutive in time, with hopping potentially at the boundary between adjacent slots. The PUCCH may take several different formats, with the UCI containing information dependent on the format. Specifically, the PUCCH may contain a scheduling request (SR), acknowledgement responses/retransmission requests (ACK/NACK) or a Channel Quality Indication (CQI)/Channel State Information (CSI). The CQI/CSI may indicate to the eNB an estimate of the current downlink channel conditions as seen by the UE to aid channel-dependent scheduling and, if one MIMO transmission mode is configured to the UE, may include MIMO-related feedback (e.g. Precoder matrix indication, PMI).

Figure 2:
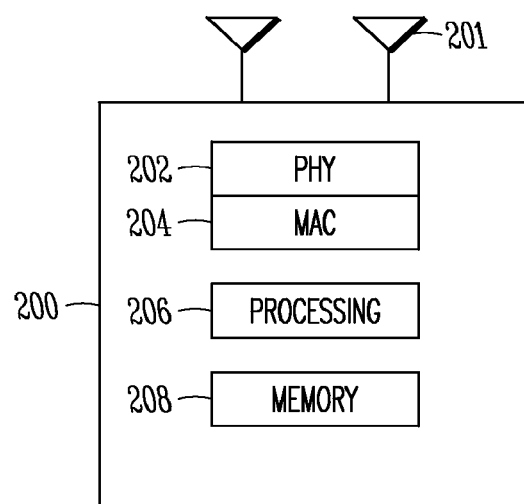
FIG. 2 is a block diagram of a 3GPP device in accordance with some embodiments.

FIG. 2 is a functional diagram of a 3GPP device in accordance with some embodiments. The device may be a UE or eNB, for example. In some embodiments, the eNB may be a stationary non-mobile device. The 3GPP device 200 may include physical layer circuitry 202 for transmitting and receiving signals using one or more antennas 201. The 3GPP device 200 may also include medium access control layer (MAC) circuitry 204 for controlling access to the wireless medium. The 3GPP device 200 may also include processing circuitry 206 and memory 208 arranged to perform the operations described herein.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

Although the 3GPP device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPP device 200 and that cause it to perform any one or more of the techniques of the present disclosure, or that is capable of storing, encoding or carrying data structures used by or associated with such instructions.

The term "transmission medium" shall be taken to include any intangible medium that is capable of storing, encoding or carrying instructions for execution, and includes digital or analog communications signals or other intangible medium to facilitate communication of such software.

As above, the upcoming 5G wireless communications technology systems may have a number of unique challenges, including carrying the inherent ability to provide different performances requirements for numerous different types of wireless devices. Higher data rates in particular may continue to drive network development and evolution for 5G system. It may be desirable for a 5G system to support a peak data rate of more than 10Gps and a minimum guaranteed user data rate of at least 100 Mbps. In addition, it may be desirable for the 5G system to support the huge increase in variety and number of Internet of Things (IoT) and Machine-Type Communication (MTC)-type devices. MTC devices have been increasingly employed for different applications, using low operational power consumption and infrequent small burst transmissions. Moreover, it may be desirable for the 5G system to provide an extremely high level of reliable connectivity with guaranteed low latency, availability and reliability-of-service for mission critical MTC use cases.

In general, 5G systems may use a plurality of Radio Access Technologies (RATs), unlike previous 2G, 3G and 4G, systems. For example, an enormous amount of spectrum may be available through the use of higher frequency bands. In one example, the use of millimeter wave (mmWave) frequency bands ranging from 30 to 300 GHz may provide the desired scalability, capacity and density for the 5G system. In this case, a new RAT may be defined for the mmWave band to achieve low latency and higher peak data rate. The RAT for mmWave band communications may differ from the RAT for one or more of the other frequency bands used to provide communication services. In some embodiments, the RATs may be used simultaneously by a single eNB for communications with different UEs.

In some embodiments, a 5G system may be provided that contains multiple RATs in a unified framework to support diverse applications, use cases and services and inter-networking in multiple frequency bands, including both licensed and unlicensed frequency bands. The RATs used in the licensed and unlicensed may be independent of each other. In some embodiments, flexible subcarrier spacing and symbol duration (i.e., configurable numerology) may be provided across the frequency bands used in the 5G system. In addition, the 5G system may include mechanisms to multiplex multiple RATs, sub-RATs and other partitions in different or the same frequency resource or frequency bands.

The inter-networking in the unified frame structure may include, in some embodiments, a Transmission Time Interval (TTI) boundary alignment between multiple RATs may be provided to allow seamless scheduling, fallback and support of different RATs. In some embodiments, a TTI is the smallest unit of time in which the eNB is capable of scheduling any UE for uplink or downlink transmission. In some embodiments, the TTI boundary alignment may occur at a subframe or frame boundary. As used herein, a unified RAT with flexible air interface for the 5G system is referred to as a flexible Radio Access Technology (FRAT). A UE that communicates with an eNB operating using the FRAT may remain using a single air interface technology (i.e., RAT) or may switch between different RATs.

In some embodiments, a unified RAT with configurable numerologies may be used in the 5G system in which a base subcarrier spacing ($\Delta f$) and symbol duration (T) can be defined in the FRAT. In one example, to maintain the backward compatibility for existing LTE and LTE-Advanced systems, a base subcarrier spacing and symbol duration can be specified as $\Delta f$=15 KHz and T=66.7 μs. Moreover, for convenience in some embodiments a single oscillator may be used, with the subcarrier spacing and symbol duration for different RATs specified as an integer number of the base subcarrier spacing and symbol duration, respectively.

Similarly, when a low latency use case and service is desired, a shortened symbol duration may be employed to reduce the latency by using larger subcarrier spacing. The subcarrier spacing and symbol duration may in this case be defined as $\Delta f_i = K * \Delta f$ and $T_i = (1/K) * T$. In one example, for frequency band between 6 GHz and 30 GHz, K can be chosen as 10, leading to a subcarrier spacing and symbol duration of 150 KHz and 6.67 μs, respectively. This may result in a 0.1 ms TTI for low latency use case. In another example, for frequency bands below 6 GHz, which includes the current LTE frequency range, K can be selected by the network to be 2 or 4, and the corresponding subcarrier spacing and symbol duration changed proportional to the selected K value. Alternatively, the same subcarrier spacing and symbol duration can be defined for frequency bands below 6 GHz (i.e., K=1), but a shorter TTI can be considered, e.g., with a fewer number of symbols, to support low latency use cases.

To efficiently support a massive number of MTC devices used in the 5G network, in other embodiments, the subcarrier spacing and symbol duration can be defined as $\Delta f_i = (1/K) * \Delta f$ and $T_i = K * T$. In such embodiments, K can be selected to be 10, and the subcarrier spacing and symbol duration 1.5 KHz and 667 μs, respectively. In this case, the subframe duration for MTC use cases can be defined to be 10 ms, in the current generation LTE systems the length of a typical frame, rather than the typical 1 ms. This may reduce the power consumption of MTC UEs by reducing the amount of time the MTC UE is active, thereby increasing the battery life of the MTC UEs.

A UE may be initially assigned the appropriate RAT by the eNB or other network device (such as the MME). In some embodiments, the UE may be configurable to communicate using any of the RATs, as indicated via the eNB, and can configure the subcarrier spacing and symbol duration accordingly. In some embodiments, the UE may be limited to communicating only using a subset of the RATs, and perhaps only a single RAT, e.g., when the UE is an MTC UE having a limited bandwidth and capabilities. The RAT may depend on the type of UE as well as the operating mode of the UE. For example, some UEs may change mode between a normal mode and an enhanced coverage mode in situations in which the link budget to the nearest serving eNB is worse than a typical link budget value in the network and additional link budget is to be obtained without increasing transmission power Enhanced coverage mode may be employed by a variety of UEs, including a normal UE (e.g., a smartphone or the like), a machine-to-machine (M2M) UE or a stationary wireless UE (i.e., a UE that remains indefinitely in a single location) using MTC. The UE may determine whether additional link budget is desired, as well as how much additional link budget is desired, and enter an appropriate enhanced coverage mode (that provides the appropriate additional link budget). The different enhanced coverage modes may correspond to different RATs. Some UEs, such as low cost, low complexity MTC UEs, further may be band limited and operate in a narrow bandwidth of e.g., to 1.4 MHz, for both control and data channels, leading to the ability to operate, e.g., in a single RAT unless the RAT is modified by the network.

Figure 3:
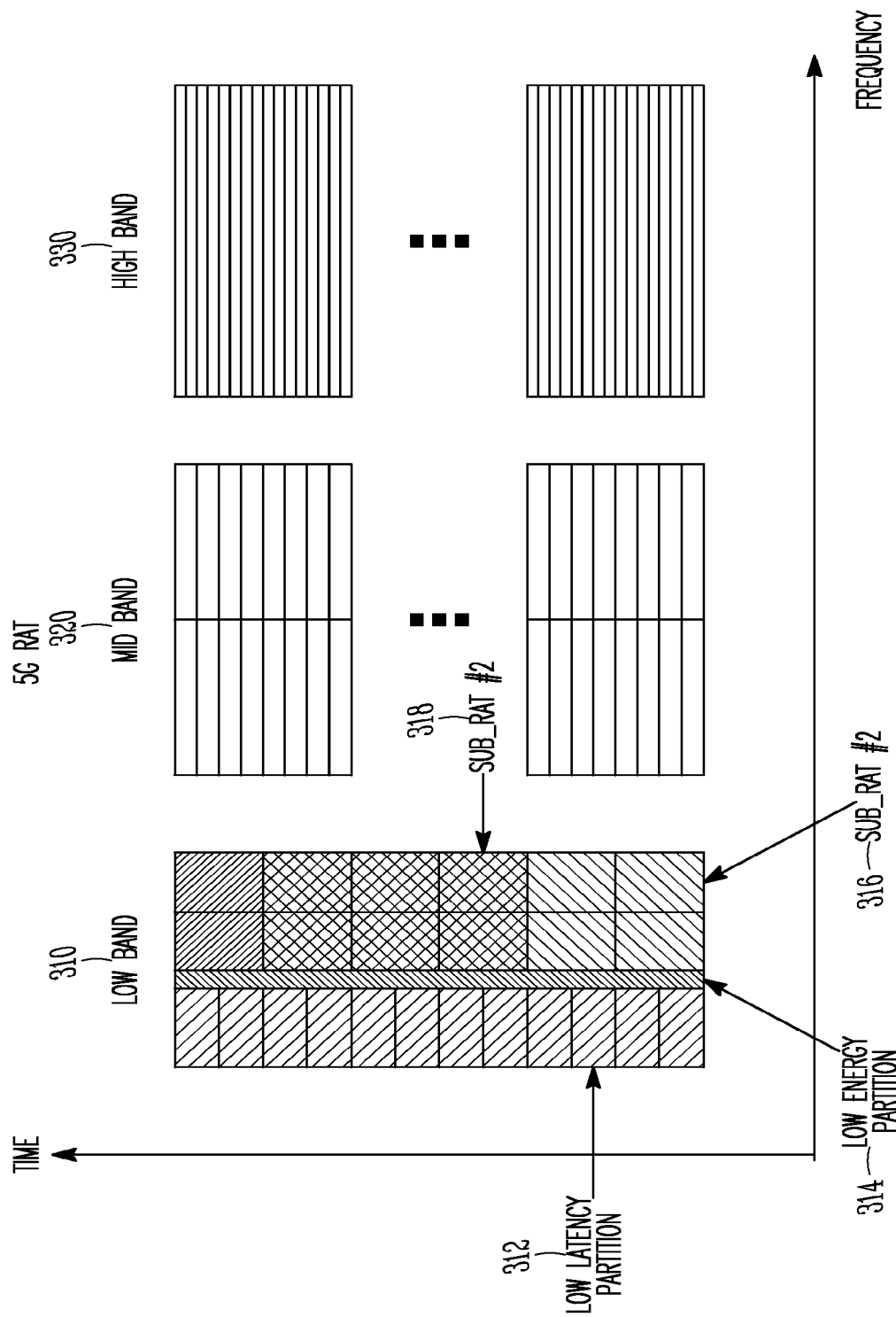
FIG. 3 illustrates one embodiment of a flexible Radio Access Technology (FRAT) of a 5G system in accordance with some embodiments.

FIG. 3 illustrates one embodiment of a FRAT of a 5G system in accordance with some embodiments. The FRAT 300 may contain one or more partitions in different frequency band regions 310, 320, 330. In one example, the low frequency band 310 may include frequencies used in 4G systems (up to 6 GHz), the mid-frequency band 320 may include higher frequencies (e.g., 6-30 GHz) and the high frequency band 330 may include the highest frequencies in the 5G system (e.g., mmWave, above 30 GHz). Although the RATs of only a low frequency band 310, a mid-frequency band 320, and a high frequency band 330 are shown, any number of RATs of different frequency bands may exist. The various RATs in frequency bands may each have a subcarrier spacing and symbol duration that is independent of the subcarrier spacing and symbol duration of another RAT in another frequency band (i.e., the RATs have configurable numerologies). Moreover, within each frequency band, one or more sub-RATs and partitions 312, 314, 316, 318 may be present with each sub-RAT or partition 312, 314, 316, 318 having a subcarrier spacing and symbol duration independent of the subcarrier spacing and symbol duration of another sub-RAT or partition 312, 314, 316, 318 and independent of the RAT in other frequency bands. As shown in FIG. 3, the sub_RATs 316, 318 in the low frequency band 310 may have the same subcarrier spacing and symbol duration and may be separated by frequency and/or time, while partitions 312, 314 may have different subcarrier spacings and symbol durations from each other and the sub_RATs 316, 318 and may be separated by frequency and/or time. Although the low frequency band 310 is shown as having multiple partitions 312, 314 and sub_RATs 316, 318, the mid frequency band 320 is shown as having two sub_RATs and the high frequency band 330 is shown as having no sub_RATs, the eNB may establish the number and type of RATs used within a particular frequency band differently.

In some embodiments, RATs and sub-RATs with same or different numerologies can be multiplexed. The multiplexing may be via Time-Division Multiplexing (TDM), Frequency-Division Multiplexing (FDM), code-division multiplex (CDM), spatial division multiplex (SDM), other possible orthogonal or non-orthogonal multiplexing schemes, or any combination thereof. For example, multiple RATs, sub-RATs or partitions with same or different numerologies can be multiplexed in a TDM manner. Each RAT, sub-RAT and partition may have a numerology, access scheme and modulation scheme that is independent of the numerology, access scheme and modulation scheme of the other RATs, sub-RATs and partitions. The numerologies, resource allocation and partition information in the time domain can be predefined or configured by higher layer signaling, e.g. via a Master Information Block (MIB), System Information Block (SIB) or UE-specific dedicated RRC signaling. If a MIB is used to indicate the partition configuration for multiple RATs, sub-RATs or partitions, the resource for the transmission physical broadcast channel (PBCH) used to carry the MTB may be predefined and known at the UEs. In some embodiments, the PBCH may be transmitted in a predetermined RAT, independent of the UE or number of RATs, sub-RATs or partitions supported. Once the UE receives the configuration information via the PBCH on the predetermined RAT, the UE may use a different RAT for further control and data communications; that is, the predetermined RAT and the RAT used by the UE to communicate may be independent.

In some embodiments, multiple RATs, sub-RATs or partitions with same or different numerologies can be multiplexed in a FDM manner. To minimize the interference between multiple RATs, sub-RATs or partitions with different numerologies, guard bands may be inserted at the edge of frequency resources allocated for the RATs, sub-RATs or partitions. Similar to the above, the numerologies and/or resource partition for multiple RATs, sub-RATs or partitions may be predefined or configured by high layer signaling via a MIB, SIB or UE-specific dedicated RRC signaling.

In embodiments in which numerologies and/or resource partition for multiple RATs, sub-RATs or partitions is predefined or dedicated carriers are allocated for different RATs, a dedicated downlink synchronization signal and PBCHs may be transmitted on each RAT, sub-RAT or partition. In embodiments in which the numerologies and/or resource partition for multiple RATs, sub-RATs or partitions is configured using a MTB or SIB, a single MTB or SIB may be transmitted on one of the RAT, sub-RAT or partition. After successfully decoding the MIB or SIB, the UEs may be able to derive the resource information or numerologies for other RATs, sub-RATs or partitions. Thus, information provided from the eNB to the UE via a single transmission in a particular RAT, sub-RAT or partition may enable communications using different RATs, sub-RATs or partitions.

Particular RATs/sub-RATs/partitions may be used for different types of communications, with each having independently sized resource blocks. For example, as shown, the resources in a first partition 312 may be used for low-latency communications while the resources in a second partition 314 may be used for low energy communications. The first and second partitions 312, 314 may be multiplexed, as shown, using FDM such that the first and second partitions 312, 314 occupy the same time but different frequency resources. The first partition 312 may be associated with low latency communications in which the UE operates in a low latency mode and may have a short symbol duration and TTI, while the second partition 314 may be associated with low energy communications in which the UE operates in a low energy mode and may have a long symbol duration and TTI.

Other sub-RATs 316, 318 may similarly be FDM multiplexed with the first and second partitions 312, 314 and TDM multiplexed with each other. The sub-RATs 316, 318 may have a symbol duration and TTI between those associated with the first and second partitions 312, 314.

The RATs 320, 330 for the mid- and high-frequency band may be supported simultaneously with each other and the RAT 310 for low frequency band, while maintaining TTI boundary alignment between the different RATs 310, 320, 330. The RATs 320, 330 may similarly be FDM multiplexed with the first and second partitions 312, 314 and sub-RATs 316, 318. The RATs 320, 330 may have a symbol duration and TTI smaller than those associated with the first partition 312. As shown in FIG. 3, in some embodiments, the amount of temporal and/or frequency resources associated with the different RATs, sub-RATs and partitions may differ among the different types, and the same type may be associated either with different amounts of temporal and/or frequency resources (e.g., as partitions 312, 314) or the same amount of temporal and/or frequency resources (e.g., as sub-RATs 316, 318). A given frequency and temporal range may be associated with a particular frame and symbol structure (as well as subcarrier spacing and symbol duration), with the frame and symbol structures of the frequency and temporal range independent of the frame and symbol structures of other frequency and temporal ranges.

Figure 4:
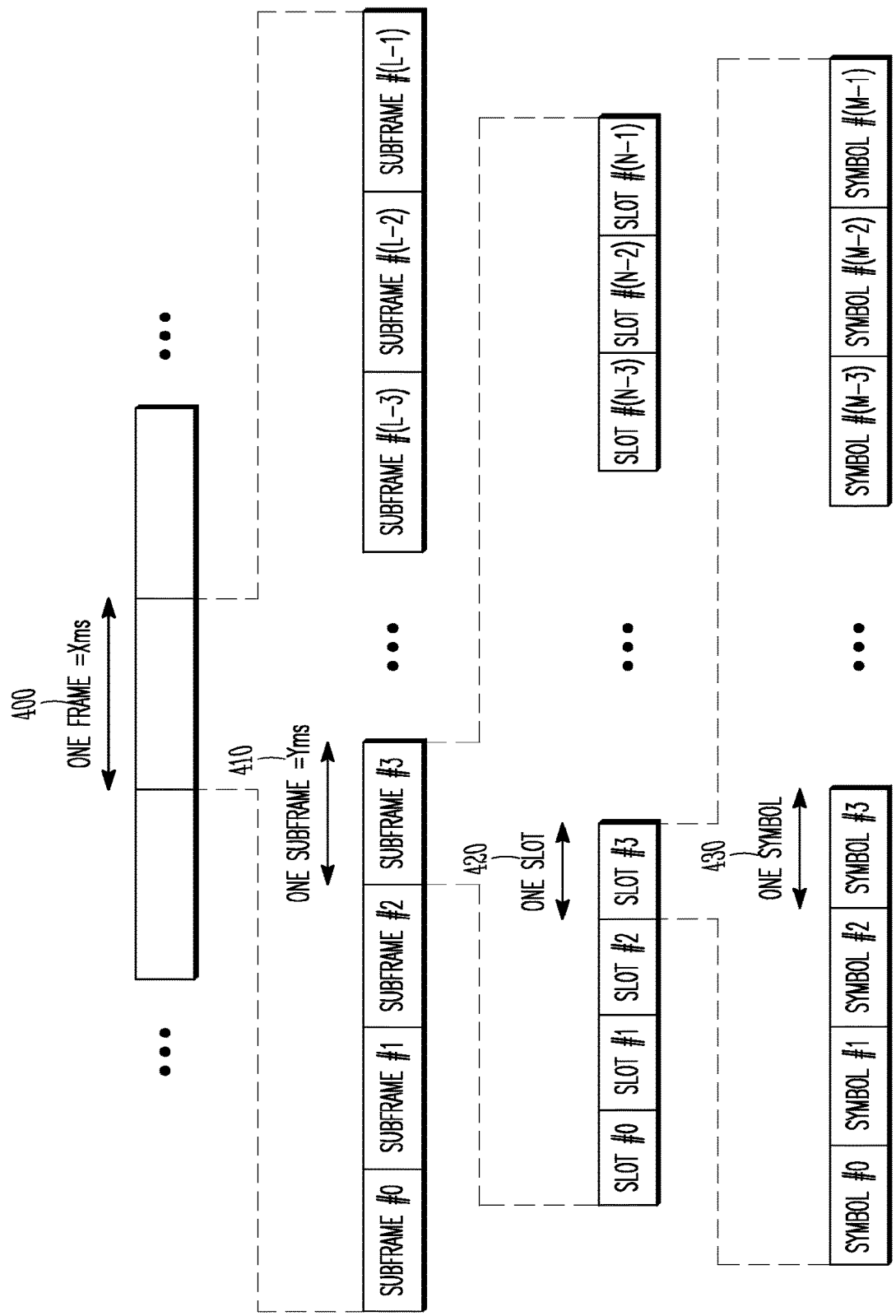
FIG. 4 illustrates a unified frame structure in accordance with some embodiments.

FIG. 4 illustrates a unified frame structure in accordance with some embodiments. The unified frame structure contains frames 400, subframes 410, slots 420 and symbols 430. More specifically, each frame 400 may contain L subframes of equal duration and have an overall duration of X ms. Each subframe 410 may similarly comprise N slots of equal duration and have an overall duration of Y ms. Each slot may, in turn, comprise M symbols of equal duration. The slot and symbol durations may be different between subframes of different RATs depending on specific use cases, frequency bands and deployment scenarios. The frame structure of each of RAT may be independent of the frame structure of the other RATs. Thus, a particular RAT may have one or more of different L, N and/or M values, as well as different X and/or Y values, as the other RATs. This may also apply to the sub-RATs and partitions shown in FIG. 3.

Figure 5:
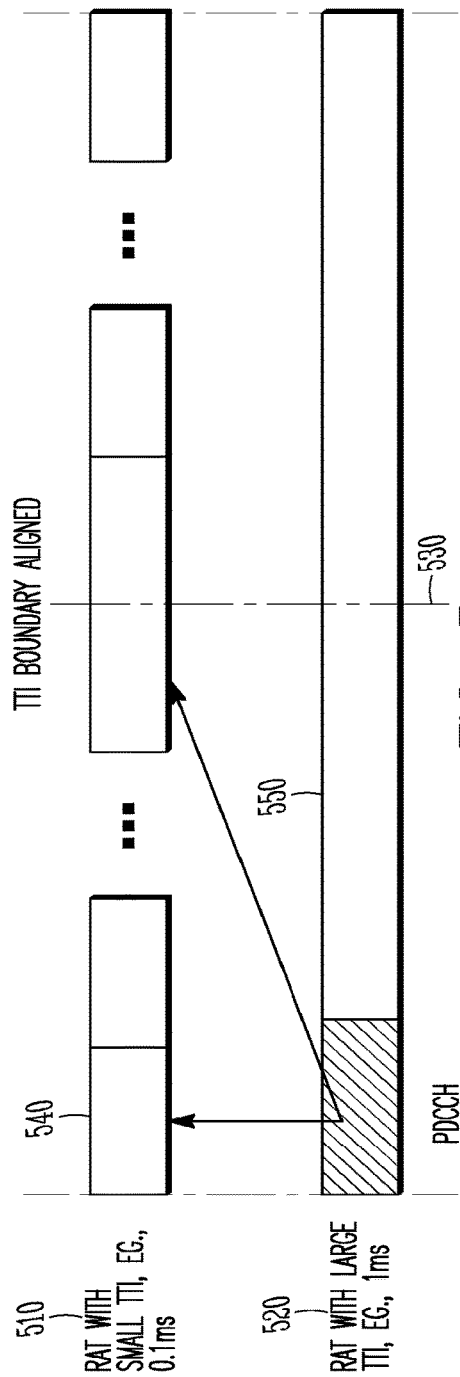
FIG. 5 illustrates a Transmission Time Interval (TTI) boundary alignment in accordance with some embodiments.

FIG. 5 illustrates a Transmission Time Interval (TTI) boundary alignment in accordance with some embodiments. In some embodiments of the unified frame structure, it may be beneficial from a simplified design standpoint to periodically align the TTI boundary 530 between different RATs 510, 520, e.g., at a particular subframe or frame boundary after a predetermined number of subframes or frames. Thus, in some embodiments an integral number of TTIs 540 of a RAT 510 having a smaller TTI duration (low latency RAT) may be disposed within a single TTI 550 of a RAT 520 having a larger TTI duration. In the example shown in FIG. 5, the smaller TTI duration RAT 510 may have a TTI 540 of 0.1 ms while the larger TTI RAT 520 may have a TTI 550 of 1 ms. By implementing a TTI of 1 ms, a low latency RAT TTI may align with the existing LTE specification TTI boundary. Having a common TTI boundary may support cross-carrier/RAT scheduling for high frequency band RATs from low frequency band RATs based an anchor booster architecture. This is to say that, in some embodiments for cross-carrier/RAT scheduling, as shown a common PDCCH may be used to schedule other RATs, with the UE switching to a particular RAT to obtain the scheduling and then switching to another RAT to communicate and perhaps to obtain further scheduling information using that RAT. In some embodiments, the other RAT may contain a PDCCH for additional scheduling, while in other embodiments the other RAT may not contain a PDCCH, in which case the UE may periodically switch to the scheduling RAT to obtain scheduling information for the other RAT. In some embodiments, a UE may obtain initial scheduling information (e.g., when it initially powers on or otherwise accesses the eNB) from the initial RAT (e.g., a conventional 4G system RAT) and from then on, after switching to its assigned RAT, obtains scheduling information using that RAT. In other embodiments, each RAT may contain a PDCCH and scheduling is performed for the UE operating on the RAT. A licensed low frequency band RAT may provide reliable coverage for control signaling as an anchor cell, using the PDCCH shown in FIG. 5, while a high frequency band RAT may provide opportunistic boosting in data rate when channel conditions are favorable as booster cell.

Figure 6:
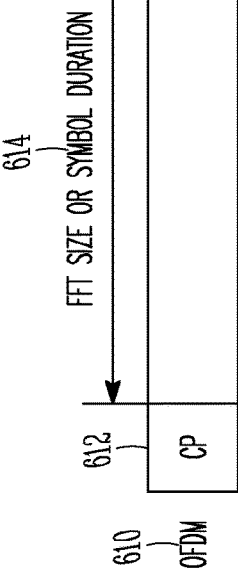
FIG. 6 illustrates a symbol structure in accordance with some embodiments.
Figure 6:
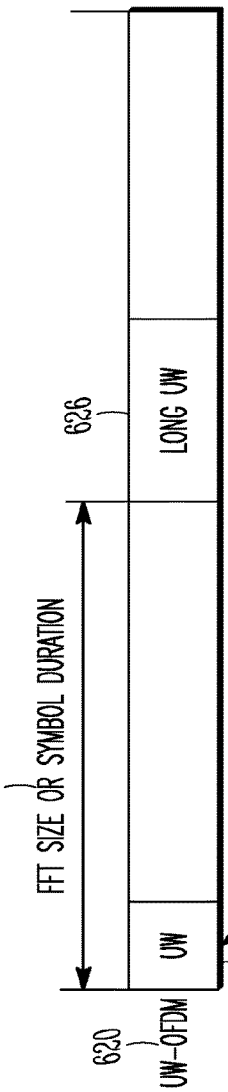

FIG. 6 illustrates a symbol structure in accordance with some embodiments. FIG. 6 shows an OFDM symbol 610 and a unique word (UW) OFDM symbol 620. Each OFDM symbol 610 may contain a cyclic prefix (CP) 612 that comprises a replication of the initial portion of the OFDM symbol 610. The CP 612 may range in size from ¼ to ¹⁄₃₂ of the symbol period 614. The CP 612 may be disposed at the end of the symbol or outside the symbol, depending on specific waveform, thereby creating a guard between the symbol and the adjacent symbol. In some embodiments, when OFDM downlink and SC-FDMA uplink waveforms are selected for a 5G RAT, the CP 612 may be inserted outside the symbol 610. In embodiments in which a UW OFDM symbol 620 or UW Discrete Fourier transform-Spread-Orthogonal Frequency Division Multiplexing (UW-DFT-s-OFDM) symbol is used, the UW 622 may be inserted within one symbol duration 624. The symbol structure may be independent for each of the RATs, such that whether or not a particular RAT a CP or UW and whether the CP or UW is outside or within a symbol is independent of the symbol structure of any other RAT.

As shown in FIG. 6, the UW-OFDM 620 may be used to support different UW lengths based on different channel delay spreads while maintaining the same symbol duration (or FFT size). This enables both shorter UW 622 and longer UW 626 to be used in the same size symbol 624 as the UW 622, 624 is inserted within the FFT instead of being adding after the FFT size. The ability to maintain the same symbol duration may provide a greater flexibility to support a unified RAT design. In one example, using an OFDM symbol for a low frequency band (below 6 GHz), a subcarrier spacing of 60 KHz (i.e., K=4, Δf=60 KHz) may be used to achieve a 0.1 ms TTI. This translates to OFDM symbols of T=16.7 ms (66.7 ms/K). Thus, 5 OFDM symbols may be able to be accommodated within one subframe (83.5 μs) with a CP length of approximately 3.3 μs (0.1 ms−83.5 μs=16.5 μs/5 CPs).

Figure 7:
FIG. 7 illustrates frame structures within a TTI in accordance with some embodiments.

FIG. 7 illustrates frame structures within a TTI in accordance with some embodiments. In FIG. 7, various TTIs 710, 720, 730, 740 are illustrated in which the TTIs 710, 720, 730, 740 comprise UW-OFDM waveforms. The first TTI 710 shown in FIG. 7 may comprise a UW 712 and symbol 714 of typical length. In this example, the subcarrier spacing may be 15 KHz and the symbol duration 716 may be 66.7 μs. A total of 3 OFDM symbols 716 may be present in a TTI 710 of 200 μs.

The second TTI 720 shown in FIG. 7 may comprise a low latency TTI 720 with short symbol duration. Such a TTI 720 can be used for use cases such as mission critical MTC applications and Vehicle-to-Vehicle applications, among others. The UW 722 and symbol 724 may each be smaller than the first TTI 710. In this example, the subcarrier spacing may be 30 KHz and the symbol duration 726 may be 33.3 μs. For a TTI 720 of the same length as the first TTI (e.g., 200 μs), a total of 6 short OFDM symbols 726 may be present.

The third TTI 730 shown in FIG. 7 may comprise another low latency TTI 730 similar to the low latency TTI 720. The UW 732 and symbol 734 may each be smaller than the first TTI 710, the subcarrier spacing may be 30 KHz and the symbol duration 736 may be 33.3 μs. However, in this example the TTI 730 may only be half the length as the first TTI (i.e., 100 μs), corresponding to a total of 3 short OFDM symbols 736.

The fourth TTI 740 shown in FIG. 7 may comprise a low energy TTI 740, e.g., for use by MTC UEs. The UW 742 and symbol 744 may each have a longer duration smaller than the first TTI 710. In one example, the subcarrier spacing may be 5 KHz and the symbol duration 746 may be 200 μs. In this example, the TTI 740 may be 1 ms, corresponding to a total of 5 long OFDM symbols 746.

The above TTIs 710, 720, 730, 740 may be FDM or TDM multiplexed based on the FRAT design. One or more of the UW-OFDM waveforms may be replaced by other waveforms so long as the same symbol duration is maintained. Other examples of OFDM waveforms may include ZT-OFDM and UW-DFTs-OFDM, among others. When different waveforms are used in the same carrier, multi-RATs can be supported where each RAT may have different waveform design. In some embodiments, existing LTE waveforms may be reused, i.e., OFDM waveforms may be used for downlink and SC-FDMA waveforms may be used for uplink communications. In some embodiments, OFDM may be used both downlink and uplink communications. In some embodiments, UW-based waveforms may be used both downlink and uplink communications. For example, UW-OFDM waveforms may be used for downlink communications and UW-DFT-s-OFDM waveforms may be used for uplink communications or either UW-OFDM or UW-DFT-s-OFDM waveforms may be used for both downlink and uplink communications. In some embodiment, filtered OFDM and filter-bank multiple carrier (FBMC) may be used. FBMC waveforms are produced using a nonrectangular sub-channel pulse shape in the time domain during OFDM-offset quadrature amplitude modulation (OQAM) transmission (in which the real part of QAM symbols are mapped to ½ of the multi-carrier symbols and the imaginary parts are mapped to an interlaced ½ of the multi-carrier symbols) and may lack a CP.

Figure 8A:
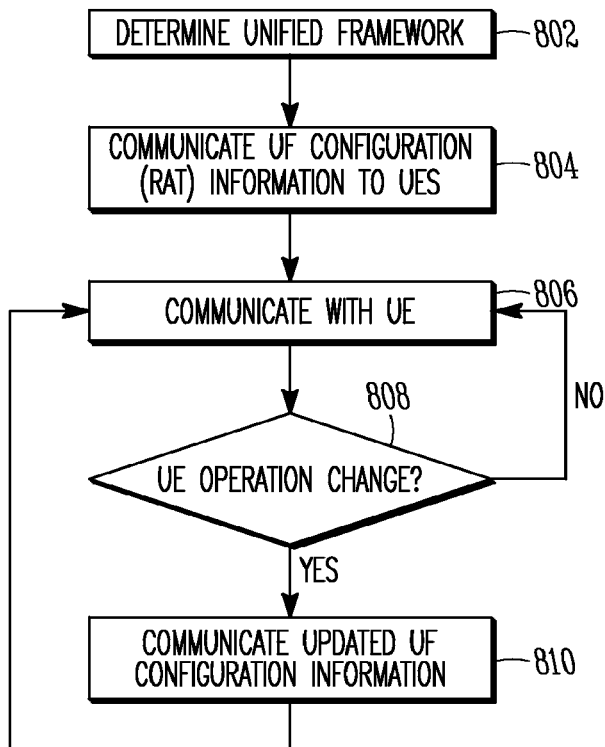
FIGS. 8A and 8B illustrate flowcharts of a uniform framework utilization method in accordance with some embodiments.

Tables 1-3 below illustrate various examples of 5G numerology.

a uniform framework utilization method of an eNB such as the eNB shown in FIG. 1 or 2 in accordance with some embodiments. As shown in FIG. 8A, the eNB may determine the unified framework at operation 802. The unified framework may include access scheme, modulation scheme, frame structure, symbol structure, and configurable numerology including subcarrier spacing and symbol duration. The different frame and symbol structures may be associated with different temporal and/or frequency resources multiplexed respectively in a TDM or FDM manner.

At operation 804, the eNB may communicate specific unified framework configuration information of a particular RAT to one or more UEs serviced by the eNB. Different RAT information may be provided to different UEs attached to the eNB, in which different RATs may be associated with different frequency bands and/or time spans. The eNB may determine the configuration information to be provided to a particular UE based on the device type and/or data to be communicated between the UE and the eNB. The frequency bands may include both licensed and unlicensed frequency bands. The RAT information may include access and modulation scheme, frame and symbol structure, as well as numerology. The RAT information may also include resource allocation and partition information. The unified framework configuration information provided to each UE may be independent of the unified framework configuration

TABLE 1

First 5G numerology example

| Frequency Band | Subcarrier spacing | TTT | DL waveform | UL waveform |
|---|---|---|---|---|
| <3 GHz (low power or MTC) | 1.5 KHz | 10 ms | OFDM | SC-FDMA |
| <3 GHz | 15 KHz | 1 ms | OFDM | SC-FDMA |
| [3-6] GHz | 75 KHz | 0.2 ms | UW-OFDM | UW-DFT-s-OFDM |
| [6-30] GHz | 480 KHz | 0.1 ms | UW-OFDM | UW-DFT-s-OFDM |
| >30 GHz | 1.5 MHz | 0.1 ms | DFT-s-OFDM | DFT-s-OFDM |

TABLE 2

Second 5G numerology example

| Frequency Band | Subcarrier spacing | TTI | DL waveform | UL waveform |
|---|---|---|---|---|
| <3 GHz (low power or MTC) | 1.5 KHz | 10 ms | UW-OFDM | UW-OFDM |
| <3 GHz | 15 KHz | 1 ms | UW-OFDM | UW-OFDM |
| [3-6] GHz | 75 KHz | 0.2 ms | UW-OFDM | UW-OFDM |
| [6-30] GHz | 480 KHz | 0.1 ms | UW-DFT-s-OFDM | UW-DFT-s-OFDM |
| >30 GHz | 1.5 MHz | 0.1 ms | OFDM | OFDM |

TABLE 3

Third 5G numerology example

| Frequency Band | Subcarrier spacing | TTI | DL waveform | UL waveform |
|---|---|---|---|---|
| <3 GHz (low power or MTC) | 1.5 KHz | 10 ms | OFDM | OFDM |
| <3 GHz | 15 KHz | 1 ms | OFDM | OFDM |
| [3, 6] GHz | 75 KHz | 0.2 ms | OFDM | OFDM |
| [6, 30] GHz | 480 KHz | 0.1 ms | UW-DFT-s-OFDM | UW-DFT-s-OFDM |
| >30 GHz | 1.5 MHz | 0.1 ms | UW-DFT-s-OFDM | UW-DFT-s-OFDM |

Figure 8B:
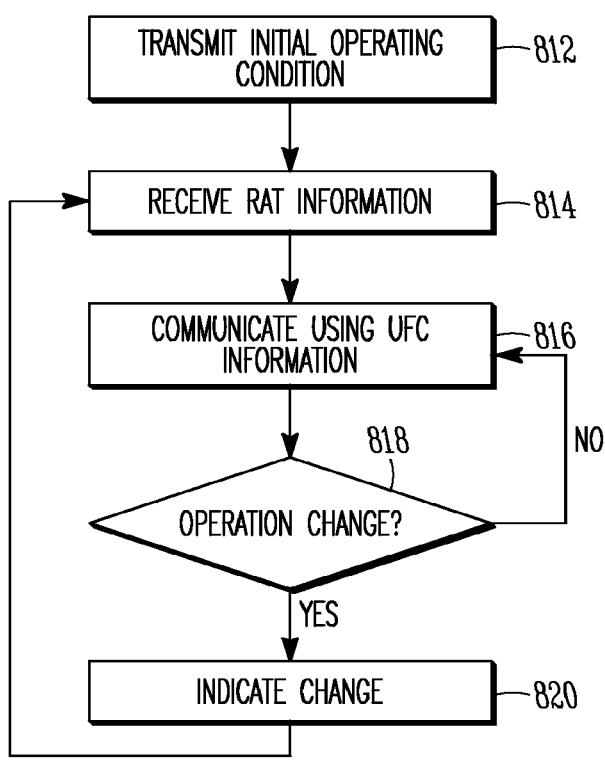

FIGS. 8A and 8B illustrate flowcharts of a uniform framework utilization method in accordance with some embodiments. FIG. 8A in particular illustrates a flowchart of information provided to any other UE. The RAT indicated by the eNB to the UE may be dependent on the type and/or operating mode of the UE.

The eNB may communicate with the UE at operation 806 using the RAT provided at operation 804. The information may include data and/or control information. For example, downlink communications from the eNB to the UE may include paging or control signals for channel estimation on the PDCCH and voice or video data from another UE on the PDSCH. The RAT information may be provided using a dedicated RAT that is different from the RAT used for communication with the UE or using a dedicated carrier on the RAT used for communication with the UE.

The eNB may, subsequent to communicating with the UE, receive an indication from the UE of a change of operating state of the UE at operation 808. The UE may, for example, be configured to operate in one or more of a normal mode, a low latency and low energy mode. The eNB may, at operation 804, assign the RAT to the UE based on the initial mode of the UE and determine that an update of the operation mode of the UE has occurred at operation 808.

In response to determining at operation 808 that an update of the operation mode of the UE has occurred, the eNB may determine a new RAT and transmit the updated unified framework configuration information of the new RAT to the UE at operation 810. The new RAT may include a different frame and/or symbol structure and use a different frequency spectrum and/or time range. The eNB may then continue to communicate with the UE at operation 806.

FIG. 8B illustrates a uniform framework utilization method as performed by a UE in accordance with some embodiments. The UE may be the UE shown in FIG. 1 or 2 and may attach to the eNB prior to communicating data. During the attachment, the UE may transmit the initial operation conditions to the eNB at operation 812. In particular, the UE may provide a UE type and/or operating mode during attachment. For example, the UE may be a MTC UE. The UE may moreover be configured to operate in a low latency and/or low energy mode. In some embodiments, a MTC UE may operate in an enhanced coverage, low energy mode.

In response to transmitting the operating conditions, unified framework configuration (RAT) information may be received by a particular UE at operation 814. The RAT information may be dependent on the type and/or operating mode of the UE. The RAT may be associated with a particular frequency band and/or time range. For example, when the UE operates in the low latency mode, a larger subcarrier spacing and shorter symbol duration may be indicated by the unified framework configuration information; while when the UE operates in the low energy mode, a smaller subcarrier spacing and longer symbol duration may be indicated by the unified framework configuration information.

Once the RAT received by the UE, the UE may then communicate using the RAT at operation 816. The UE may, for example, adjust FFT operating conditions and processing to meet the RAT information provided at operation 814. The UE may communicate with the eNB or may communicate directly with other UEs using device-to-device communication (D2D) communication. The information may include uplink and downlink data and/or control information. For example, the information may include uplink communications of voice or video data for another UE or measurements of control signals for channel estimation.

The UE may, subsequent to communicating with the eNB, determine that a change of operating conditions is warranted at operation 818. For example, the UE may transition between the normal and enhanced coverage/low energy mode dependent on UE location, or between the normal and low latency mode dependent on the type of communication to transmit.

In response to determining that a change of operating conditions is warranted at operation 818, at operation 820 the UE may transmit an indication to the eNB indicating the change of operating state of the UE. The UE may instead determine that a change of operating conditions is desired at operation 820 and wait to change operating state until a new RAT is assigned to the UE.

In response to transmitting the indication at operation 820, the UE may return to operation 814 and receive a new RAT at operation 810. The new RAT may include a different frame and/or symbol structure and use a different frequency spectrum and/or time range. The eNB may then continue to communicate with the UE at operation 816.

Various examples of the disclosure are provided below. These examples are not intended to in any way limit the disclosure herein. In Example 1, user equipment (UE) may comprise processing circuitry configured to: configure a transceiver to receive a resource allocation from a network using a first Radio Access Technology (RAT), the first RAT selected from a plurality of RATs of a flexible RAT (FRAT) employed by the network, the plurality of RATs of the FRAT each comprising configurable numerology with flexible subcarrier spacing and symbol duration and associated with at least one of different temporal and frequency resources, the transceiver configurable to communicate using the plurality of RATs and configure the subcarrier spacing and symbol duration based on the numerology; and configure the transceiver to communicate using the first RAT.

In Example 2, the subject matter of Example 1 can optionally include that the processing circuitry is further configured to configure the transceiver to receive from an enhanced NodeB (eNB) higher layer signaling associated with the FRAT, the higher layer signaling indicating numerologies, resource allocation and partition information in at least one of a time and frequency domain.

In Example 3, the subject matter of one or any combination of Examples 1-2 can optionally include that the FRAT comprises a base subcarrier spacing and symbol duration, and at least one of the subcarrier spacing and symbol duration for different RATs of the FRAT is respectively specified as an integer number of the base subcarrier spacing or symbol duration.

In Example 4, the subject matter of one or any combination of Examples 1-3 can optionally include that the UE is a Machine-Type Communication (MTC) UE configured to operate in at least one of a low latency and low energy mode, and the first RAT comprises a larger subcarrier spacing and shorter symbol duration when the UE operates in the low latency mode and comprises a smaller subcarrier spacing and longer symbol duration when the UE operates in the low energy mode.

In Example 5, the subject matter of one or any combination of Examples 1-4 can optionally include that at least one of the plurality of RATs of the FRAT comprises at least one of a plurality of sub-RATs and partitions, each of the at least one of the plurality of sub-RATs and partitions comprising an independent configurable numerology with flexible subcarrier spacing and symbol duration and associated with at least one of different temporal and frequency resource, and the plurality of RATs and the at least one of the plurality of sub-RATs and partitions are combined using at least one of a Time-Division Multiplexing (TDM), Frequency-Division Multiplexing (FDM), Code-Division Multiplexing (CDM), and Spatial Division Multiplexing (SDM).

In Example 6, the subject matter of one or any combination of Examples 1-6 can optionally include that the plurality of RATs and the at least one of the plurality of sub-RATs and partitions are combined using TDM, and numerologies, resource allocation and partition information in a time domain are at least one of predefined or configured by higher-layer signaling via Master Information Block (MIB), System Information Block (SIB) or UE-specific dedicated Radio Resource Control (RRC) signaling, or the plurality of RATs and the at least one of the plurality of sub-RATs and partitions are combined using FDM, guard bands are inserted at an edge of frequency resources allocated for the plurality of RATs and the at least one of the plurality of sub-RATs and partitions, and at least one of numerologies and resource partition for the plurality of RATs and the at least one of the plurality of sub-RATs and partitions are at least one of predefined or configured by the higher-layer signaling.

In Example 7, the subject matter of one or any combination of Examples 1-6 can optionally include that a Transmission Time Interval (TTI) boundary between different RATs of the plurality of RATs is common, and the plurality of RATs comprise a common reference TTI duration.

In Example 8, the subject matter of one or any combination of Examples 1-7 can optionally include that a symbol structure of each of the plurality of RATs comprises a cyclic prefix (CP) or unique word (UW) outside or within a symbol, and the symbol structure of each of the plurality of RATs is independent of the symbol structure of the other RATs.

In Example 9, the subject matter of one or any combination of Examples 1-8 can optionally include that the processing circuitry is further configured to configure the transceiver to communicate using Orthogonal Frequency-Division Multiplexing (OFDM) for downlink communications and one of Single Carrier Frequency-Division Multiple Access (SC-FDMA) and OFDM for uplink communications, and configure the transceiver to communicate using at least one of UW-OFDM and UW Discrete Fourier transform-Spread-Orthogonal Frequency Division Multiplexing (UW-DFT-s-OFDM).

In Example 10, the subject matter of one or any combination of Examples 1-9 can optionally include that a frame structure in each of the plurality of RATs comprises a frame comprising L subframes, each subframe comprising N slots, each slot comprising M symbols, and the frame structure of each of the plurality of RATs is independent of the frame structure of the other RATs.

In Example 11, the subject matter of one or any combination of Examples 1-10 can optionally include that the processing circuitry is further configured to configure the transceiver to receive numerologies, resource allocation and partition information via Master Information Block (MIB) carried by a physical broadcast channel (PBCH), a System Information Block (SIB) or UE-specific dedicated Radio Resource Control (RRC) signaling in a second RAT, the first and second RATs being different.

In Example 12, the subject matter of one or any combination of Examples 1-11 can optionally include that the processing circuitry is configured to configure the transceiver to receive numerologies, resource allocation and partition information via a dedicated carrier in the first RAT, a dedicated carrier allocated for each of the plurality of RATs, and a dedicated downlink synchronization signal and physical broadcast channel (PBCH) is able to be received on each of the plurality of RATs.

In Example 13, the subject matter of one or any combination of Examples 1-12 can optionally include an antenna configured to transmit and receive communications between the transceiver and the eNB.

Example 14 comprises an apparatus of an eNode B (eNB) comprising processing circuitry configured to: configure a transceiver to transmit resource allocations for different Radio Access Technologies (RATs) to a plurality of user equipment (UE), at least two of the UEs associated with a different RAT, each RAT comprising an independent subcarrier spacing, symbol duration, frame structure and symbol structure; and configure the transceiver to communicate with each UE using the RAT associated with the UE.

In Example 15, the subject matter of Example 14 can optionally include that the processing circuitry is configured to configure the transceiver to transmit higher layer signaling indicating numerologies, resource allocation and partition information via Master Information Block (MIB) carried by a physical broadcast channel (PBCH), a System Information Block (SIB) or UE-specific dedicated Radio Resource Control (RRC) signaling in a same RAT to each of the plurality of UEs.

In Example 16, the subject matter of one or any combination of Examples 14-15 can optionally include that the processing circuitry is configured to configure the transceiver to transmit numerologies, resource allocation and partition information via a dedicated carrier allocated for each of the RATs, and a dedicated downlink synchronization signal and physical broadcast channel (PBCH) is able to be received on each of the RATs.

In Example 17, the subject matter of one or any combination of Examples 14-16 can optionally include that at least one of the subcarrier spacing and symbol duration for each of the RATs is respectively specified as an integer number of a base subcarrier spacing or symbol duration.

In Example 18, the subject matter of one or any combination of Examples 14-17 can optionally include that the RATs comprise a first RAT comprising a larger subcarrier spacing and shorter symbol duration configured for a UE operating in a low latency mode and a second RAT comprising a smaller subcarrier spacing and longer symbol duration configured for a UE operating in a low energy mode.

In Example 19, the subject matter of one or any combination of Examples 14-18 can optionally include that a Transmission Time Interval (TTI) boundary between the RATs is common, and the RATs comprise a common reference TTI duration.

In Example 20, the subject matter of one or any combination of Examples 14-19 can optionally include that a symbol structure of each of the RATs comprises a cyclic prefix (CP) or unique word (UW) outside or within a symbol, and the symbol structure of each of the RATs is independent of the symbol structure of the other RATs.

In Example 21, the subject matter of one or any combination of Examples 14-20 can optionally include that the processing circuitry is configured to at least one of: configure the transceiver to communicate using Orthogonal Frequency-Division Multiplexing (OFDM) for downlink communications and one of Single Carrier Frequency-Division Multiple Access (SC-FDMA) and OFDM for uplink communications, and configure the transceiver to communicate using at least one of UW-OFDM and UW Discrete Fourier transform-Spread-Orthogonal Frequency Division Multiplexing (UW-DFT-s-OFDM).

In Example 22 a non-transitory computer-readable storage medium that stores instructions for execution by one or more processors of a user equipment (UE) to configure the UE to communicate with an enhanced Node B (eNB), the one or more processors to configure the UE to: receive resource allocation, partition information and numerology, including subcarrier spacing and symbol duration, for a first Radio Access Technology (RAT) of a plurality of RATs used by the eNB, the UE configurable to configure the subcarrier spacing and symbol duration based on the numerology and to communicate using the plurality of RATs; and communicate using the first RAT.

In Example 23, the subject matter of Example 22 can optionally include that at least one of: a) at least one of the subcarrier spacing and symbol duration for the RATs is respectively specified as an integer number of a base subcarrier spacing or symbol duration, b) the UE is configured to operate in at least one of a low latency and low energy mode, and the first RAT comprises a larger subcarrier spacing and shorter symbol duration when the UE operates in the low latency mode and comprises a smaller subcarrier spacing and longer symbol duration when the UE operates in the low energy mode, and c) a Transmission Time Interval (TTI) boundary between the RATs is common, and the RATs comprise a common reference TTI duration.

In Example 24, the subject matter of one or any combination of Examples 22-23 can optionally include that at least one of: a) a symbol structure of each of the RATs comprises a cyclic prefix (CP) or unique word (UW) outside or within a symbol, and the symbol structure of each of the RATs is independent of the symbol structure of the other RATs, and b) a frame structure in each of the RATs comprises a frame comprising L subframes, each subframe comprising N slots, each slot comprising M symbols, and the frame structure of each of the RATs is independent of the frame structure of the other RATs.

In Example 25, the subject matter of one or any combination of Examples 22-24 can optionally include that the numerology, resource allocation and partition information is received via Master Information Block (MIB) carried by a physical broadcast channel (PBCH), a System Information Block (SIB) or UE-specific dedicated Radio Resource Control (RRC) signaling in a second RAT, the first and second RATs being different.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
at least one processor configured to cause a user equipment (UE) to:
receive a first physical downlink control channel (PDCCH) in a first partition of a Flexible Radio Access Technology (FRAT) used by a base station, wherein the first partition is associated with a first numerology of the FRAT, and wherein receiving the first PDCCH includes reception of scheduling information from the base station for a second partition associated with a second numerology of the FRAT,
wherein respective subcarrier spacings of the first and second numerologies of the FRAT correspond to different integer multiples of 15 kHz, and
wherein the FRAT comprises a unified frame structure for the first and second partitions, and wherein the unified frame structure includes:
a frame comprising one or more subframes and corresponding to a frame duration of X milliseconds (ms); and
a subframe comprising one or more slots and corresponding to a subframe duration of Y milliseconds (ms), wherein each slot of the one or more slots comprises one or more symbols, and wherein a slot duration and a symbol duration are different within one subframe of the one or more subframes for the first and second partitions.

2. The apparatus of claim 1, wherein subframes of the one or more subframes between the first and second partitions are aligned in time.

3. The apparatus of claim 1, wherein:
the FRAT comprises a base subcarrier spacing and symbol duration, and
at least one of the subcarrier spacing and symbol duration for each of the first and second partitions is respectively specified as an integer number of the base subcarrier spacing or symbol duration.

4. The apparatus of claim 1, wherein the FRAT utilizes a plurality of radio access technologies (RATs) and wherein:
the plurality of RATs comprises a common reference transmission time interval (TTI) duration, and
the second partition uses second sub carrier spacing and symbol duration different from the first partition, wherein a TTI boundary alignment exists between the first and second partitions, wherein the TTI is a smallest unit of time in which the UE is scheduled for uplink or downlink transmission, and wherein a first TTI for the first partition is different from a second TTI for the second partition.

5. The apparatus of claim 1, wherein the FRAT utilizes a plurality of radio access technologies (RATs) and wherein:
the LTE is a Machine-Type Communication (MTC) UE configured to operate in at least one of a low latency and low energy mode, and
a first RAT of the plurality of RATs of the FRAT comprises a larger subcarrier spacing and shorter symbol duration when the UE operates in the low latency mode and comprises a smaller subcarrier spacing and longer symbol duration when the UE operates in the low energy mode.

6. The apparatus of claim 1, wherein the FRAT utilizes a plurality of radio access technologies (RATs) and wherein:
at least one of the plurality RATs of the FRAT comprises at least one of a plurality of sub-RATs and partitions, each of the at least one of the plurality of sub-RATs and partitions comprising an independent configurable numerology with flexible subcarrier spacing and symbol duration and associated with at least one of different temporal and frequency resource, and
the plurality of RATs and the at least one of the plurality of sub-RATs and partitions are combined using at least one of a Time-Division Multiplexing (TDM), Frequency-Division Multiplexing (FDM), Code-Division Multiplexing (CDM), and Spatial Division Multiplexing (SDM).

7. The apparatus of claim 6, wherein the FRAT utilizes a plurality of radio access technologies (RATs) and wherein one of:
the plurality of RATs and the at least one of the plurality of sub-RATs and partitions are combined using TDM, and numerologies, resource allocation and partition information in a time domain are at least one of predefined or configured by higher-layer signaling via Master Information Block (MIB), System Information Block (SIB) or UE-specific dedicated Radio Resource Control (RRC) signaling, or
the plurality of RATs and the at least one of the plurality of sub-RATs and partitions are combined using FDM, guard bands are inserted at an edge of frequency resources allocated for the plurality of RATs and the at least one of the plurality of sub-RATs and partitions, and at least one of numerologies and resource partition for the plurality of RATs and the at least one of the plurality of sub-RATs and partitions are at least one of predefined or configured by the higher-layer signaling.

8. The apparatus of claim 1, wherein the FRAT utilizes a plurality of radio access technologies (RATs) and wherein:
a Transmission Time interval (TTI) boundary between different RATs of the plurality of RATs of the FRAT is common, and
the plurality of RATs comprises a common reference TTI duration.

9. The apparatus of claim 1, wherein the FRAT utilizes a plurality of radio access technologies (RATs) and wherein:
a symbol structure of each of the first and second partitions comprises a cyclic prefix (CP), and the symbol structure of each of the plurality of RATs is independent of the symbol structure of other partitions.

10. The apparatus of claim 1, wherein the at least one processor is further configured to cause the UE to:
communicate using Orthogonal Frequency-Division Multiplexing (OFDM) for downlink communications and one of Single Carrier Frequency-Division Multiple Access (SC-FDMA) and OFDM for uplink communications, and
communicate using at least one of unique word (UW)-OFDM (UW-OFDM) and UW Discrete Fourier transform-Spread-Orthogonal Frequency Division Multiplexing (UW-DFT-s-OFDM).

11. A method, comprising:
by a base station (BS):
transmitting, to a user equipment (UE), a first physical downlink control channel (PDCCH) in a first partition of a Flexible Radio Access Technology (FRAT) used by the BS, wherein the first partition is associated with a first numerology of the FRAT, and wherein receiving the first PDCCH includes reception of scheduling information from the BS for a second partition associated with a second numerology of the FRAT,
wherein respective subcarrier spacings of the first and second numerologies of the FRAT correspond to different integer multiples of 15 kHz, and
wherein the FRAT comprises a unified frame structure for the first and second partitions, and wherein the unified frame structure includes:
a frame comprising one or more subframes and corresponding to a frame duration of X milliseconds (ms); and
a subframe comprising one or more slots and corresponding to a subframe duration of Y milliseconds (ms), wherein each slot of the one or more slots comprises one or more symbols, and wherein a slot duration and a symbol duration are different within one subframe of the one or more subframes for the first and second partitions.

12. The method of claim 11, wherein subframes of the one or more subframes between the first and second partitions are aligned in time.

13. The method of claim 11, wherein the FRAT utilizes a plurality of radio access technologies (RATs) and wherein the method further comprises:
transmitting higher layer signaling indicating numerologies, resource allocation and partition information via Master Information Block (MIB) carried by a physical broadcast channel (PBCH), a System Information Block (SIB) or UE-specific dedicated Radio Resource Control (RRC) signaling in a same RAT of the FRAT to each of a plurality of UEs.

14. The method of claim 11, wherein the FRAT utilizes a plurality of RATs and the method further comprises:

transmitting numerologies, resource allocation and partition information via a dedicated carrier allocated for each of one or more RATs of the FRAT, wherein a dedicated downlink synchronization signal and physical broadcast channel (PBCH) is able to be received on each of the one or more RATs.

15. A user equipment (UE), comprising:

transceiver circuitry; and one or more processors coupled to the transceiver circuitry and configured to cause the UE to:

receive a first physical downlink control channel (PDCCH) in a first partition of a Flexible Radio Access Technology (FRAT) used by a base station, wherein the first partition is associated with a first numerology of the FRAT, and wherein receiving the first PDCCH includes reception of scheduling information from the base station for a second partition associated with a second numerology of the FRAT, wherein respective subcarrier spacings of the first and second numerologies of the FRAT correspond to different integer multiples of 15 kHz, wherein the FRAT comprises a unified frame structure for the first and second partitions, and wherein the unified frame structure includes:

a frame comprising one or more subframes and corresponding to a frame duration of X milliseconds (ms); and a subframe comprising one or more slots and corresponding to a subframe duration of Y milliseconds (ms), wherein each slot of the one or more slots comprises one or more symbols, and wherein a slot duration and a symbol duration are different within one subframe of the one or more subframes for the first and second partitions.

16. The UE of claim 15, wherein subframes of the one or more subframes between the first and second partitions are aligned in time.

17. The UE of claim 15, wherein:

the FRAT comprises a base subcarrier spacing and symbol duration, and at least one of the subcarrier spacing and symbol duration for each of the first and second partitions is respectively specified as an integer number of the base subcarrier spacing or symbol duration.

18. The UE of claim 15, wherein the FRAT utilizes a plurality of radio access technologies (RATs) and wherein:

the plurality of RATs comprise a common reference transmission time interval (TTI) duration, and the second partition uses second sub carrier spacing and symbol duration different from the first partition, wherein a TTI boundary alignment exists between the first and second partitions, wherein the TTI is a smallest unit of time in which the UE is scheduled for uplink or downlink transmission, and wherein a first TTI for the first partition is different from a second TTI for the second partition.

19. The UE of claim 15, wherein the FRAT utilizes a plurality of radio access technologies (RATs) and wherein:

the UE is a Machine-Type Communication (MTC) UE configured to operate in at least one of a low latency and low energy mode, and a first RAT of the plurality of RATs of the FRAT comprises a larger subcarrier spacing and shorter symbol duration when the UE operates in the low latency mode and comprises a smaller subcarrier spacing and longer symbol duration when the UE operates in the low energy mode.

20. The UE of claim 15, wherein the FRAT utilizes a plurality of radio access technologies (RATs) and wherein:

at least one of the plurality RATs of the FRAT comprises at least one of a plurality of sub-RATs and partitions, each of the at least one of the plurality of sub-RATs and partitions comprising an independent configurable numerology with flexible subcarrier spacing and symbol duration and associated with at least one of different temporal and frequency resource, and the plurality of RATs and the at least one of the plurality of sub-RATs and partitions are combined using at least one of a Time-Division Multiplexing (TDM), Frequency-Division Multiplexing (FDM), Code-Division Multiplexing (CDM), and Spatial Division Multiplexing (SDM).

* * * * *

UNITED STATES PATENT AND TRADEMARK OFFICE
CERTIFICATE OF CORRECTION

| | | |
|---|---|---|
| PATENT NO. | : 11,611,957 B2 | Page 1 of 1 |
| APPLICATION NO. | : 17/724711 | |
| DATED | : March 21, 2023 | |
| INVENTOR(S) | : Jong-Kae Fwu et al. | |

It is certified that error appears in the above-identified patent and that said Letters Patent is hereby corrected as shown below:

In the Claims

Column 21, Line 28, Claim 5, delete "LTE" and insert --UE--.

Column 22, Line 7, Claim 8, delete "internal" and insert --Interval--.

Signed and Sealed this
Seventh Day of November, 2023

Katherine Kelly Vidal
*Director of the United States Patent and Trademark Office*